US008983387B1

(12) United States Patent
Maclean

(10) Patent No.: US 8,983,387 B1
(45) Date of Patent: Mar. 17, 2015

(54) APPARATUS AND METHODS FOR REMOTE CONTROL OF ELECTRONIC DEVICES

(75) Inventor: Wallace James Maclean, Hawkestone (CA)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 13/536,606

(22) Filed: Jun. 28, 2012

(51) Int. Cl.
*H04B 7/00* (2006.01)

(52) U.S. Cl.
USPC .................. 455/41.3; 455/41.1; 455/41.2

(58) Field of Classification Search
CPC .................................................... G08C 2201/42
USPC ................................................ 455/41.1–41.3
See application file for complete search history.

(56) References Cited

U.S. PATENT DOCUMENTS 7,292,843 B2 * 11/2007 Ishikawa et al. .............. 455/411
7,586,398 B2 * 9/2009 Huang et al. ................. 340/10.5
7,865,568 B1 * 1/2011 Redi ............................. 709/217

* cited by examiner

*Primary Examiner* — Tuan H Nguyen
(74) *Attorney, Agent, or Firm* — Troutman Sanders LLP; James E. Schutz; Christopher C. Close

(57) ABSTRACT

In accordance with aspects of the disclosure, a portable computing device may be configured as a universal remote control to wirelessly control one or more electronic devices in a control area. The portable computing device may be configured to transmit over a network to a remotely located network server, one or more queries for control commands for communicating with each electronic device in the control area via control signals. The one or more queries may identify each of the electronic devices. The portable computing device may be configured to receive over the network from the network server, command codes for the portable computing device to communicate with each of the electronic devices through the control commands via the control signals. The portable computing device may be configured to execute the received command codes to communicate with each of the electronic devices in the control area.

17 Claims, 9 Drawing Sheets

APPARATUS AND METHODS FOR REMOTE CONTROL OF ELECTRONIC DEVICES

TECHNICAL FIELD

This description relates to remote control of electronic devices.

BACKGROUND

Some known computing devices are capable of controlling other nearby computing devices via wireless signals. A universal remote is an electronic device that is programmable to remotely operate various consumer electronics devices. Some universal remotes allow a user to manually program control codes into the universal remote. Some universal remotes provided with electronic devices include programmable capabilities for other electronic devices. For example, a television remote can be programmed to operate a video player. Some universal remotes have limited memory and processing capability, and programming a universal remote can be somewhat complex. Therefore, there exists a need to provide a more user-friendly universal remote.

SUMMARY

In accordance with aspects of the disclosure, a method of using a portable computing device as a universal remote control may be provided to wirelessly control one or more electronic devices in a control area. The method may include transmitting, from the portable computing device, over a network to a remotely located network server, one or more queries for control commands for communicating with each electronic device in the control area via control signals. The one or more queries may identify each of the electronic devices. The method may include receiving, at the portable computing device, over the network from the network server, command codes for the portable computing device to communicate with each of the electronic devices through the control commands via the control signals. The method may include executing, by at least one processor of the portable computing device, the received command codes to communicate with each of the electronic devices. The portable computing device may include one or more communication components including at least one of a transceiver, a transmitter, a receiver, and an antenna to communicate with the network server over the network and each of the electronic devices in the control area.

In accordance with aspects of the disclosure, an apparatus (e.g., a portable computing device) may be provided for use as a universal remote control to wirelessly control one or more electronic devices in a control area. The apparatus may include a module configured for transmitting over a network to a remotely located network server, one or more queries for control commands for communicating with each electronic device in the control area via control signals. The one or more queries may identify each of the electronic devices. The apparatus may include a module configured for receiving over the network from the network server, command codes for communicating with each of the electronic devices through the control commands via the control signals. The apparatus may include a module configured for executing the received command codes to communicate with each of the electronic devices. The portable computing device may include a processor and one or more communication components including at least one of a transceiver, a transmitter, a receiver, and an antenna to communicate with the network server over the network and each of the electronic devices in the control area.

In accordance with aspects of the disclosure, a computer program product may be provided, wherein the computer program product may be tangibly embodied on a computer-readable storage medium and include instructions that, when executed by a processor, are configured to transmit, from a portable computing device, over a network to a remotely located network server, one or more queries for control commands for communicating with each electronic device in the control area via control signals. The one or more queries may identify each of the electronic devices. The computer program product may include instructions that, when executed by the processor, are configured to receive, at the portable computing device, over the network from the network server, command codes for the portable computing device to communicate with each of the electronic devices through the control commands via the control signals. The computer program product may include instructions that, when executed by the processor, are configured to execute, by at least one processor of the portable computing device, the received command codes to communicate with each of the electronic devices. The portable computing device may include one or more communication components including at least one of a transceiver, a transmitter, a receiver, and an antenna to communicate with the network server over the network and each of the electronic devices in the control area.

The details of one or more implementations are set forth in the accompanying drawings and the description below. Other features will be apparent from the description and drawings, and from the claims.

DETAILED DESCRIPTION

Figure 1A:
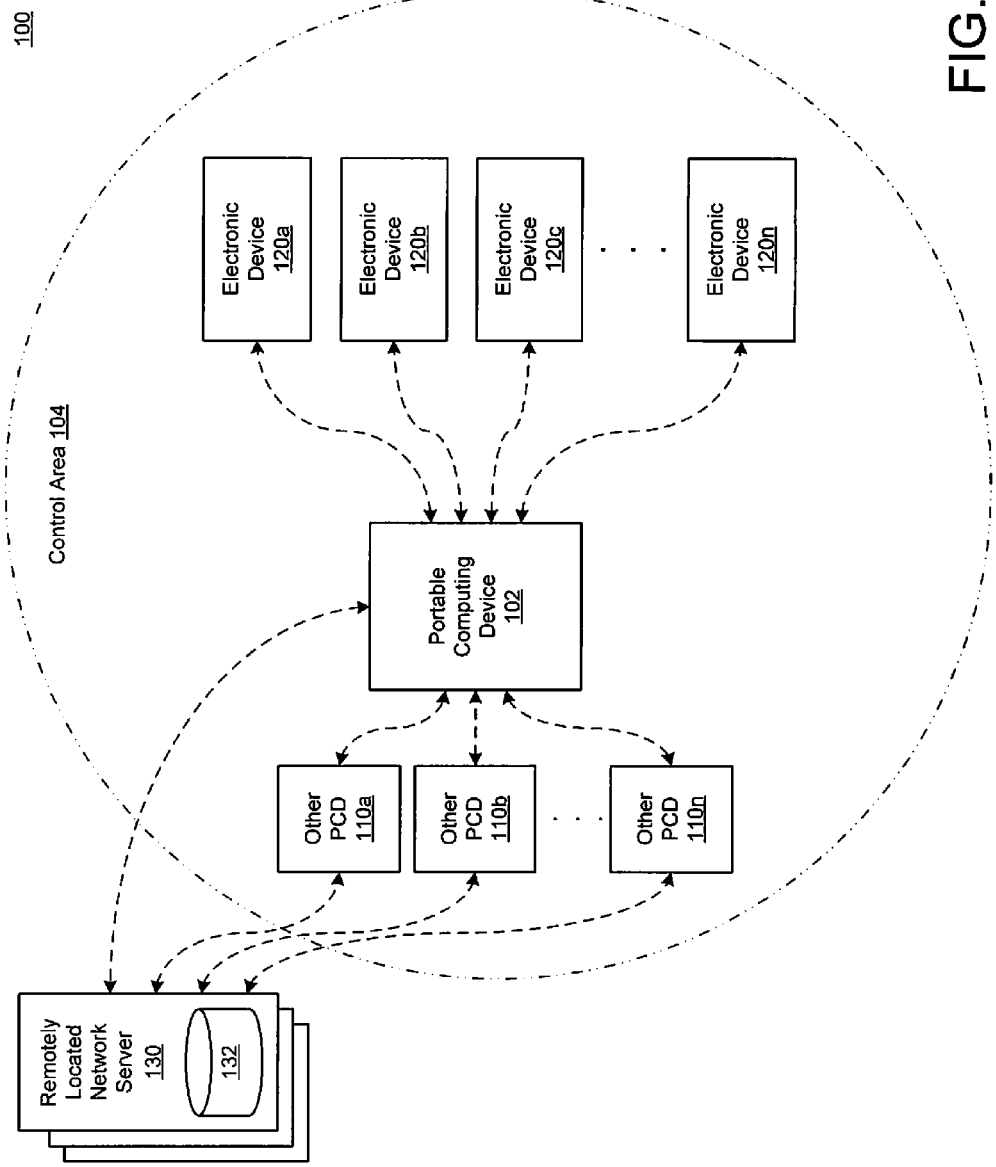
FIG. 1A is block diagram illustrating an example of a system having an apparatus for wirelessly controlling electronic devices in a control area.

FIG. 1A is a block diagram illustrating an example of a system 100 having an apparatus 102, such as a portable computing device, for wirelessly controlling one or more electronic devices 120 in a control area 104. The portable computing device 102 may be configured for use as a universal remote control to wirelessly control the one or more electronic devices 120 in the control area 104. The control area 104 may include any amount of area within the transmitting and receiving range of the portable computing device 102.

The control area 104 may include any amount of distance from the portable computing device 102 within the transmitting and receiving range of the portable computing device 102. The distance may include line-of-sight (LOS) distance.

Some users have a proliferation of remote devices for common electronic devices, such as televisions, video players, video recorders, stereos, etc. Having a single, network-connected device to control multiple electronic devices may reduce the need for multiple single-purpose remotes and may replace lost and/or broken remotes. As such, aspects of the disclosure provide a hardware/software system in which one or more necessary transceivers (e.g., infrared frequency (IRF) transceivers and/or radio frequency (RF) transceivers, such as Bluetooth, Wi-Fi, etc.) may be provided in a user device, such as the portable computing device 102 of FIG. 1A, which may comprise a smart-phone and/or tablet computer. The software/hardware system of the portable computing device 102 may be configured to query a network-maintained database 132 of a remotely located network server 130 to download control commands for each electronic device 120 in the control area 104, and where the electronic device 120 permits, automatically discover device identity to facilitate this process. In the case of electronic devices 120 providing scheduled broadcast content (e.g., television, radio, etc.), the software/hardware system of the portable computing device 102 may be configured to search a network and provide linked schedules where the user may simply select (e.g., tap, click, etc.) the desired content via a graphical user interface (GUI) of the portable computing device 102, and the portable computing device 102 may switch the electronic device 120 to the selected channel, radio station, etc. Software updates may allow for incorporation of new electronic devices 120 that added to the control area 104. As new consumer electronic devices 120 are provided as "network ready", less special-purpose transceivers (e.g., IR transceivers) may be necessary.

In the example of FIG. 1A, the portable computing device 102 may be implemented using any appropriate combination of hardware and/or software configured for wired and/or wireless communication over the network. The portable computing device 102 may be implemented as a mobile communication device (e.g., a smart phone, a wireless cellular phone, a Wi-Fi access point, a Bluetooth access point, etc.) adapted for communication with the network and in some implementations, the control area 104. The portable computing device 102 may be implemented as a personal computer (PC), a personal digital assistant (PDA), a notebook computer, a tablet computer, and/or various other generally known types of wired and/or wireless computing devices for communication with the network. It should be appreciated that the portable computing device 102 may be referred to as a user device, a user interface (UI) device, a user terminal, a client device, or a customer device without departing from the scope of the disclosure.

The portable computing device 102 may be configured for transmitting and receiving wireless communications signals to and from the network server 130 over the network via any known wireless communications technologies and protocols including radio frequency (RF), microwave frequency (MWF), and/or infrared frequency (IRF) wireless communications technologies and protocols adapted for communication over the network. Further, the portable computing device 102 may be configured for transmitting and receiving wireless communications signals to and from the one or more electronic devices 120 in the control area 104 via any known wireless communications technologies and protocols including RF, MWF, and/or IRF wireless communications technologies and protocols adapted for communication over the network.

The portable computing device 102 may be configured for transmitting over the network to one or more remotely located network servers 130 one or more queries for control commands for communicating with each electronic device 120*a*, 120*b*, 120*c*, . . . , 120*n* in the control area 104 via control signals. The one or more queries may identify each of the electronic devices 120*a*, 120*b*, 120*c*, . . . , 120*n*. The one or more queries may include information to identify each of the electronic devices 120*a*, 120*b*, 120*c*, . . . , 120*n*.

The portable computing device 102 may be configured for receiving over the network from the network server 130 command codes for the portable computing device 102 to communicate with each of the electronic devices 120*a*, 120*b*, 120*c*, . . . , 120*n* through the control commands via the control signals. In an implementation, the portable computing device 102 may be configured to download one or more control commands related to one or more of the electronic devices 120*a*, 120*b*, 120*c*, . . . , 120*n* in the control area 104. In another implementation, the portable computing device 102 may be configured to download one specific control command related to one or more of the electronic devices 120*a*, 120*b*, 120*c*, . . . , 120*n* in the control area 104. In another implementation, the portable computing device 102 may be configured to download one or more control commands related to only one specific electronic device 120*a*, 120*b*, 120*c*, . . . , 120*n* in the control area 104. In still another implementation, the portable computing device 102 may be configured to download only one specific control command related to only one specific electronic device 120*a*, 120*b*, 120*c*, . . . , 120*n* in the control area 104.

In some implementations, command codes may refer to executable codes, wherein a sequence of commands may be received by the portable computing device 102, stored in memory, and replayed to control a remote device, such as one or more of the electronic devices 120*a*, 120, 120*c*, . . . , 120*n*. As such, the portable computing device 102 may be configured to receive and store executable code from the network, for example, from a device vendor that may keep control codes proprietary or that may provide a specialized GUI for a control surface for a given target device.

The portable computing device 102 may be configured for executing, by at least one processor of the portable computing device 102, the received command codes to communicate with each of the electronic devices 120*a*, 120*b*, 120*c*, . . . , 120*n* located at least in the control area 104. In various implementations, communication between the portable computing device 102 and the electronic devices 120*a*, 120*b*, 120*c*, . . . , 120*n* may occur separately or simultaneously. In an implementation, the portable computing device 102 may be configured for executing, by at least one processor of the portable computing device 102, the received command codes to simultaneously communicate with a plurality of the electronic devices 120*a*, 120*b*, 120*c*, . . . , 120*n* located at least in the control area 104. In an implementation, the portable computing device 102 may be configured for executing, by at least one processor of the portable computing device 102, the received command codes to communicate with only one of the electronic devices 120*a*, 120*b*, 120*c*, . . . , 120*n* located at least in the control area 104.

The portable computing device 102 may include one or more communication components including one or more transceivers, one or more transmitters, one or more receivers, one or more transceiving antennas, one or more transmitting antennas, one or more receiving antennas, and/or some combination thereof to communicate with the network server 130 over the network and each of the electronic devices 120a, 120b, 120c, ..., 120n in the control area 104.

The remotely located network server 130 may include one or more network-maintained databases 132. The portable computing device 102 may be configured for accessing an account stored on the network-maintained database 132 over the network to automatically synchronize one or more control commands across one or more other portable computing devices 110a, 110b, ..., 110n along with the portable computing device 102. As such, the command codes received by the portable computing device 102 from the network server 130 to communicate with each of the electronic devices 120a, 120b, 120c, ..., 120n through the control commands via the control signals may be automatically synchronized from the portable computing device 102 to each other portable computing device 110a, 110b, ..., 110n.

In an implementation, each of the one or more other portable computing devices 110a, 110b, ..., 110n may be configured to communicate with the network server 130 over the network and access the account stored on the network-maintained database 132 of the network server 130 over the network. Accordingly, each of the one or more other portable computing devices 110a, 110b, ..., 110n may be configured to receive or download over the network from the network server 130 command codes for the portable computing device 102 to communicate with each of the electronic devices 120a, 120b, 120c, ..., 120n through the control commands via the control signals.

In an implementation, the synchronization feature of the portable computing device 102 may be configured to include synchronizing one or more control commands across one or more other portable computing devices (PCDs) 110a, 110b, ..., 110n so that each other portable computing devices (PCDs) 110a, 110b, ..., 110n may be used as a universal remote control along with the portable computing device 102. For example, if the portable computing device 102 comprised a smart phone onto which control commands were downloaded for a stereo, television, overhead lights, garage door opener, unlocking or otherwise accessing a car via a car remote, etc., and if the smart phone were used to log into an account on the network server 130, then the control commands for one or more of the other portable computing devices 110a, 110b, ..., 110n may be uploaded to the account. Then, when one of the other portable computing devices 110a, 110b, ..., 110n, such as a tablet computer, is used to log into the account on the network server 130, the control commands may be downloaded from the account to the tablet computer, so that the tablet computer may be used as a universal remote control in the control area. As such, the control commands may not need to be separately installed on each one of the other portable computing devices 110a, 110b, ..., 110n.

In another implementation, the portable computing device 102 may be configured to directly communicate with each of the other portable computing devices 110a, 110b, ..., 110n for synchronizing the one or more control commands across one or more of the other portable computing devices 110a, 110b, ..., 110n so that each other portable computing devices 110a, 110b, ..., 110n may be used as a universal remote control along with the portable computing device 102

The portable computing device 102 may be configured for uploading information associated with the one or more of the electronic devices 120a, 120b, 120c, ..., 120n from the portable computing device 102 to an account stored on the network-maintained database 132 of the network server 130 over the network. The uploaded information may include one or more control commands and/or command codes related to the one or more control commands.

The portable computing device 102 may be configured for automatically discovering an identity of each electronic device 120a, 120b, 120c, ..., 120n in the control area 104. One or more of the electronic devices 120a, 120b, 120c, ..., 120n may be configured to wirelessly communicate with the portable computing device 102 in the control area 104 using a communication protocol, such as any known wireless communication protocol including radio frequency (RF) communication protocols, such as Bluetooth, Wi-Fi, etc., and/or infrared frequency (IRF) communication protocols.

In an implementation, the portable computing device 102 may be configured for automatically discovering an identity of each other portable computing device 110a, 110b, ..., 110n in the control area 104. One or more of the other portable computing devices 110a, 110b, ..., 110n may be configured to wirelessly communicate with the portable computing device 102 in the control area 104 using a communication protocol, such as any known wireless communication protocol including radio frequency (RF) communication protocols, such as Bluetooth, Wi-Fi, etc., and/or infrared frequency (IRF) communication protocols.

In various implementations, one or more of the other portable computing devices 110a, 110b, ..., 110n and one or more of the electronic devices 120a, 120b, 120c, ..., 120n may be configured to communicate with any one of the other in the control area 104 using a communication protocol, such as any known wireless communication protocol including Wi-Fi, Bluetooth, etc. However, any communication between any devices in the control area may be authorized, managed, and terminated by the portable computing device 102 including any communication with the network server 130 from any device within the control area 104.

The network may be implemented as a single network or a combination of multiple networks. For example, the network may include a wireless telecommunications network (e.g., mobile communications network, cellular telephone network, Wi-Fi network, Bluetooth network, etc.) adapted for communication with one or more other communication networks, such as the Internet. In other examples, the network may include the Internet, one or more intranets, landline networks, wireless networks, and/or one or more other appropriate types of communication networks. As such, in various implementations, the portable communication device 102, the one or more other portable computing devices 110a, 110b, ..., 110n, and the network server 130 may be associated with a particular link (e.g., a link, such as a URL (Uniform Resource Locator) to an IP (Internet Protocol) address).

Figure 1B:
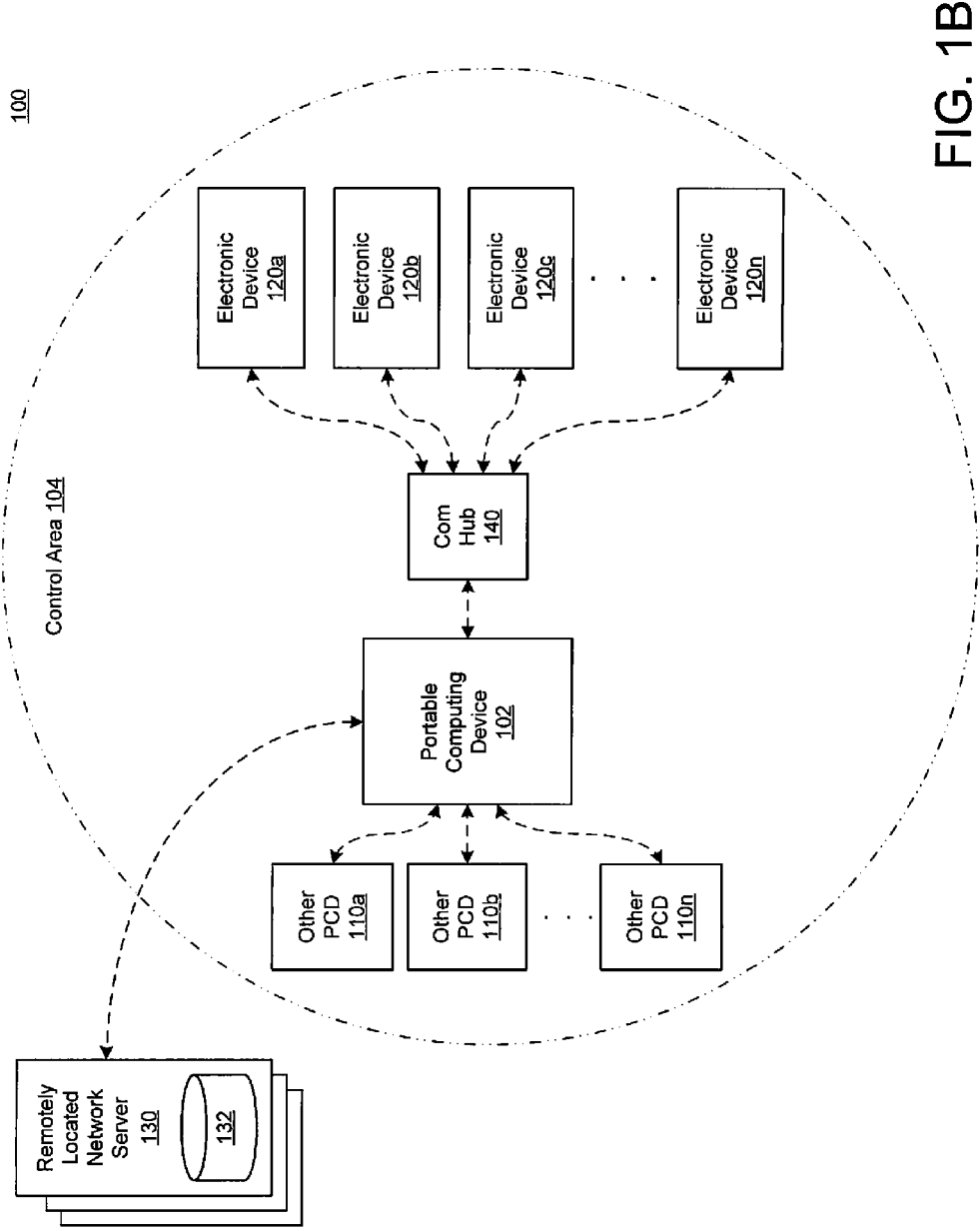
FIG. 1B is block diagram illustrating another example of a system having an apparatus for wirelessly controlling electronic devices in a control area via a communication hub.

FIG. 1B is a block diagram illustrating another example of the system 100 having the apparatus 102 (i.e., portable computing device) for wirelessly controlling the one or more electronic devices 120a, 120b, 120c, ..., 120n in the control area 104. As shown in FIG. 1B, the system 100 may include a communication hub 140 that may be configured to receive control commands from the portable communication device 102 via first control signals transmitted with a first communication protocol and then transmit the control commands to one or more of the electronic devices 120a, 120b, 120c, ..., 120n via second control signals with a second communication protocol. Accordingly, in an implementation, the portable computing device 102 may be configured for use as a universal remote control to wirelessly control the one or more electronic devices 120a, 120b, 120c, ..., 120n in the control area 104 via the communication hub 140.

In another implementation, one or more of the other portable computing devices 110a, 110b, ..., 110n may be configured for use as a universal remote control to wirelessly control the one or more electronic devices 120a, 120b, 120c, ..., 120n in the control area 104 via the communication hub 140.

The communication hub 140 may be configured for receiving wireless communications signals from the portable computing device 102 in the control area 104 via any known wireless communications technologies and protocols including RF, MWF, and/or IRF wireless communications technologies and protocols. The communication hub 140 may be configured for transmitting wireless communications signals to each of the one or more electronic devices 120a, 120b, 120c, ..., 120n in the control area 104 via any known wireless communications technologies and protocols including RF, MWF, and/or IRF wireless communications technologies and protocols.

For instance, within the control area 104, the portable computing device 102 may transmit first wireless control signals to the communication hub 140 via a first wireless protocol, such as a radio frequency (RF) wireless communication protocol (e.g., Wi-Fi, Bluetooth, etc.). The communication hub 140 may receive the first wireless control signals and convert the first wireless control signals of the first wireless protocol to second wireless control signals of a second wireless protocol that is different than the first wireless protocol, such as an infrared frequency (IRF) wireless communication protocol. The communication hub 140 may transmit the second wireless control signals via the second wireless protocol to at least one of the electronic devices 120a, 120b, 120c, ..., 120n in the control area 104.

Figure 2A:
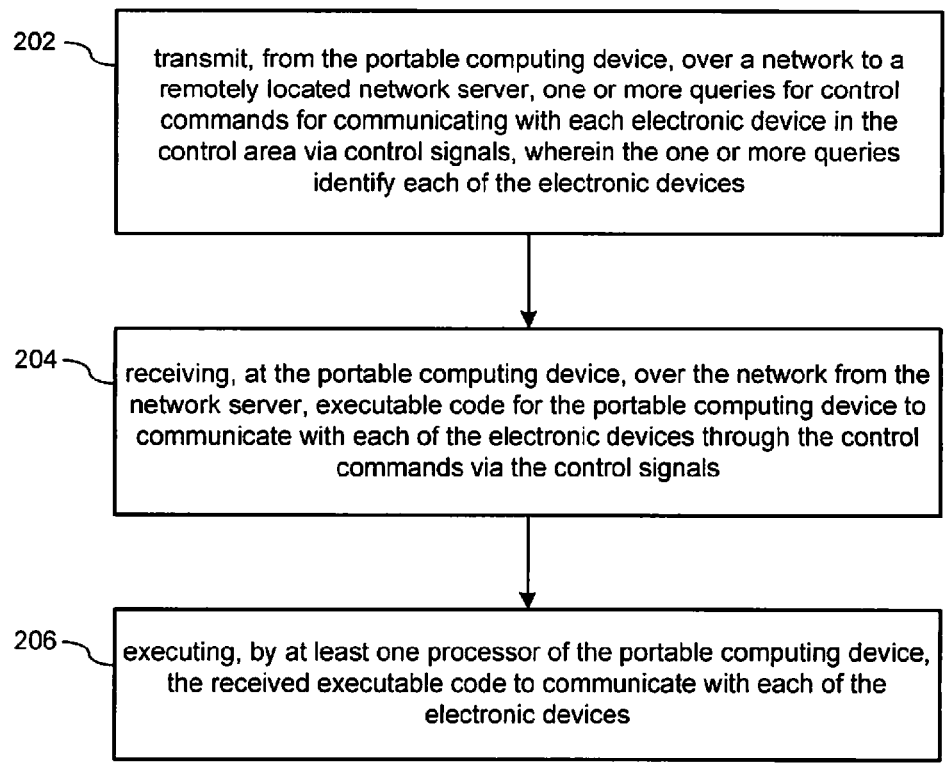
FIG. 2A is a process flow illustrating an example method for wirelessly controlling one or more electronic devices in a control area.

FIG. 2A is a process flow illustrating an example method 200 for wirelessly controlling the one or more electronic devices 120a, 120b, 120c, ..., 120n in the control area 104. In the example of FIG. 2A, operations 202-206 are illustrated as discrete operations occurring in sequential order. However, it should be appreciated that, in other implementations, two or more of the operations 202-206 may occur in a partially or completely overlapping or parallel manner, or in a nested or looped manner, or may occur in a different order than that shown. Further, additional operations, that may not be specifically illustrated in the example of FIG. 2A, may also be included in some implementations, while, in other implementations, one or more of the operations 202-206 may be omitted.

In the example of FIG. 2A, the method 200 may include a process flow for a computer-implemented method for using the portable computing device 102 as a universal remote control to wirelessly control the one or more electronic devices 120a, 120b, 120c, ..., 120n in the control area 104, as described in reference to the system 100 of FIG. 1A. Further, as described herein, the operations 202-206 may be configured to provide a simplified operational process flow that may be enacted by the portable computing device 102 of FIG. 1A and to provide features and functionalities as described in reference to FIG. 1A.

At 202, the method 200 may include transmitting, from the portable computing device 102, over a network to the remotely located network server 130, one or more queries for control commands for communicating with each electronic device 120a, 120b, 120c, ..., 120n in the control area 104 via control signals, wherein the one or more queries identify each of the electronic devices 120a, 120b, 120c, ..., 120n.

In an implementation, the method 200 may include automatically discovering an identity of each of the electronic devices 120a, 120b, 120c, ..., 120n, wherein each of the electronic devices 120a, 120b, 120c, ..., 120n are configured to wirelessly communicate with the portable computing device 102 in the control area 104 using at least one communication protocol including, for example, an RF communication protocol (e.g., Wi-Fi, Bluetooth, etc.) or an IRF communication protocol.

For instance, one or more of the electronic devices 120a, 120b, 120c, ..., 120n may include an RF ID chip attached thereto or integrated as part thereof. The portable computing device 102 may be configured to communicate with the RF ID chip of the one or more of the electronic devices 120a, 120b, 120c, ..., 120n and receive information, such as identity information, related to the corresponding electronic device 120a, 120b, 120c, ..., 120n. This identity information may include one or more parameters (e.g., manufacture name, model number, serial number, date of manufacture, etc.) associated with the manufacturing entity that manufactured the specific electronic device 120a, 120b, 120c, ..., 120n. The portable computing device 102 may be configured to automatically discover the identity of each electronic device 120a, 120b, 120c, ..., 120n by obtaining at least the model number of the corresponding electronic device 120a, 120b, 120c, ..., 120n via the RF ID chip associated therewith.

In another instance, one or more of the electronic devices 120a, 120b, 120c, ..., 120n may include a barcode attached thereto or integrated as part thereof. The portable computing device 102 may be configured to read the barcode via a scanner or picture image of the one or more of the electronic devices 120a, 120b, 120c, ..., 120n and receive information, such as identity information, related to the corresponding electronic device 120a, 120b, 120c, ..., 120n. This identity information may include one or more parameters (e.g., manufacture name, model number, serial number, date of manufacture, etc.) associated with the manufacturing entity that manufactured the specific electronic device 120a, 120b, 120c, ..., 120n. The portable computing device 102 may be configured to automatically discover the identity of each electronic device 120a, 120b, 120c, ..., 120n by obtaining at least the model number of the corresponding electronic device 120a, 120b, 120c, ..., 120n via the barcode associated therewith.

In still another instance, identity information associated with one or more of the electronic devices 120a, 120b, 120c, ..., 120n may be manually inputted by a user into the portable computing device 102 via a user interface (UI), such as a graphical user interface (GUI). The identity information that may be inputted by the user may include one or more parameters (e.g., manufacture name, model number, serial number, date of manufacture, etc.) associated with the manufacturing entity that manufactured the specific electronic device 120a, 120b, 120c, ..., 120n. The portable computing device 102 may be configured to obtaining at least the model number of the corresponding electronic device 120a, 120b, 120c, ..., 120n via manual input by a user.

In the example of FIG. 2A, at 204, the method 200 may include receiving, at the portable computing device 102, over the network from the network server 130, command codes for the portable computing device 102 to communicate with each of the electronic devices 120a, 120b, 120c, ..., 120n through the control commands via the control signals. In an implementation, the control signals may include at least one of radio frequency (RF) signals and infrared frequency (IRF) signals, and the control area 104 is defined by a communication protocol used by the portable computing device 102 to communicate with each of the electronic devices 120a, 120b, 120c, ..., 120n via at least one of the RF signals and the IRF signals.

At 206, the method 200 may include executing, by at least one processor of the portable computing device 102, the received command codes to communicate with each of the electronic devices 120a, 120b, 120c, . . . , 120n.

In an implementation, the method 200 may include executing, by at least one processor of the portable computing device 102, the received command codes to communicate with each of the electronic devices 120a, 120b, 120c, . . . , 120n by sending infrared frequency (IRF) control signals directly to each of the electronic devices 120a, 120b, 120c, . . . , 120n to separately control each electronic device 120a, 120b, 120c, . . . , 120n based on an identity of each electronic device 120a, 120b, 120c, . . . , 120n.

As described herein, the portable computing device 102 may include one or more communication components including at least one of a transceiver, a transmitter, a receiver, and an antenna to communicate with the network server 130 over the network and each of the electronic devices 120a, 120b, 120c, . . . , 120n in the control area 104.

In an implementation, the method 200 may include uploading information associated with one or more of the electronic devices 120a, 120b, 120c, . . . , 120n from the portable computing device 102 to an account stored on the network-maintained database 132 over the network, wherein the uploaded information may include control commands. For instance, a user of the portable computing device 102 may upload control commands to an account in the network server 130 and provide access to the account to one or more of the other portable computing devices 110a, 110b, . . . , 110n, so that the user is able to download one or more control commands associated with the one of the electronic devices, 120b, 120c, . . . , 120n to one or more of the other portable computing devices 110a, 110b, . . . , 110n, to allow the one or more of the other portable computing devices 110a, 110b, . . . , 110n to control the one or more of the electronic devices 120a, 120b, 120c, . . . , 120n.

The method 200 may include uploading information associated with one or more of the electronic devices 120a, 120b, 120c, . . . , 120n by an entity associated with the one or more electronic devices 120a, 120b, 120c, . . . , 120n to the network-maintained database 132 over the network, wherein the uploaded information may include control commands. For instance, a manufacturer of one of the electronic devices, 120b, 120c, . . . , 120n in the control area 104 may upload control commands to an account in the network server 130 related to the one of the electronic devices, 120b, 120c, . . . , 120n and provide access to the account to a user of the portable computing device 102, so that the user is able to download one or more control commands associated with the one of the electronic devices, 120b, 120c, . . . , 120n.

In an implementation, each of the electronic devices 120a, 120b, 120c, . . . , 120n in the control area 104 may comprise a media related device (e.g., a television, a monitor, a video player, an audio player, a stereo, a digital music player, a computer, etc.) for broadcasting one or more types of entertainment services (e.g., television related content, video related content, audio related content, image related content, etc.).

The method 200 may include searching the network for a schedule of broadcast media related content for each of the electronic devices 120a, 120b, 120c, . . . , 120n. The schedule may include a schedule of broadcast media related content linked to each of the electronic devices 120a, 120b, 120c, . . . , 120n based on an identity of each electronic device 120a, 120b, 120c, . . . , 120n. The broadcast media related content may include data for at least one of text, audio, video images, and still images.

The method 200 may include providing a user interface (UI) to separately control each of the electronic devices 120a, 120b, 120c, . . . , 120n and to separately select scheduled content for each device based on an identity of each electronic device 120a, 120b, 120c, . . . , 120n, and receiving user input via the user interface, wherein the user input may include information related to the identity of each electronic device 120a, 120b, 120c, . . . , 120n. The method 200 may further include providing a graphical user interface (GUI) with user-actuated features to separately control each electronic device 120a, 120b, 120c, . . . , 120n and to separately select scheduled broadcast content for each electronic device 120a, 120b, 120c, . . . , 120n based on the identity of each electronic device 120a, 120b, 120c, . . . , 120n.

The user interface (UI) may comprise an audio based user interface, and the method 200 may further include receiving voice commands via the audio based user interface (e.g., a microphone, voice recorder, etc.) to separately control each electronic device 120a, 120b, 120c, . . . , 120n and to separately select scheduled broadcast content for each electronic device 120a, 120b, 120c, . . . , 120n based on the identity of each electronic device 120a, 120b, 120c, . . . , 120n.

Figure 2B:
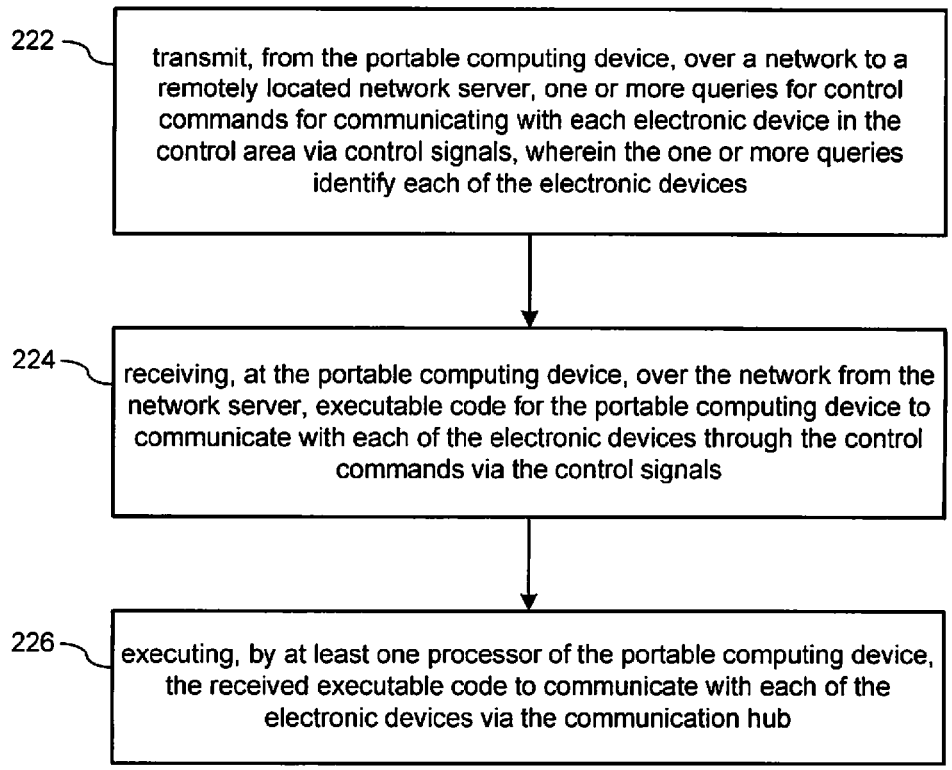
FIG. 2B is a process flow illustrating another example method for wirelessly controlling one or more electronic devices in a control area via a communication hub.

FIG. 2B is a process flow illustrating another example method 220 for wirelessly controlling the one or more electronic devices 120a, 120b, 120c, . . . , 120n in the control area 104 via the communication hub 140. In the example of FIG. 2B, operations 222-226 are illustrated as a plurality of discrete operations occurring in sequential order. However, it should be appreciated that, in other implementations, two or more of the operations 222-226 may occur in a partially or completely overlapping or parallel manner, or in a nested or looped manner, or may occur in a different order than that shown. Further, additional operations, that may not be specifically illustrated in the example of FIG. 2B, may also be included in some implementations, while, in other implementations, one or more of the operations 222-226 may be omitted.

In the example of FIG. 2B, the method 220 may include a process flow for a computer-implemented method for using the portable computing device 102 as a universal remote control to wirelessly control the one or more electronic devices 120a, 120b, 120c, . . . , 120n in the control area 104 via the communication hub 140, as described in reference to the system 100 of FIG. 1B. Further, as described herein, the operations 222-226 may be configured to provide a simplified operational process flow that may be enacted by the portable computing device 102 of FIG. 1B and to provide features and functionalities as described in reference to FIG. 1B.

At 222, the method 220 may include transmitting, from the portable computing device 102, over a network to the remotely located network server 130, one or more queries for control commands for communicating with each electronic device 120a, 120b, 120c, . . . , 120n in the control area 104 via control signals, wherein the one or more queries identify each of the electronic devices 120a, 120b, 120c, . . . , 120n.

At 224, the method 220 may include receiving, at the portable computing device 102, over the network from the network server 130, command codes for the portable computing device 102 to communicate with each of the electronic devices 120a, 120b, 120c, . . . , 120n through the control commands via the control signals.

At 226, the method 220 may include executing, by at least one processor of the portable computing device 102, the received command codes to communicate with each of the electronic devices 120a, 120b, 120c, . . . , 120n via the communication hub 140 by sending first control signals (e.g., RF control signals, such as Wi-Fi control signals, Bluetooth control signals, etc.) via a first communication protocol (e.g., RF communication protocol, such as Wi-Fi, Bluetooth, etc.) to the communication hub 140 to separately control each electronic device 120a, 120b, 120c, . . . , 120n based on an identity of each electronic device 120a, 120b, 120c, . . . , 120n. In an implementation, the communication hub 140 may be configured to receive the first control signals (e.g., RF control signals) via a first communication protocol (e.g., RF communication protocol, such as Wi-Fi, Bluetooth, etc.), convert the first control signals to second control signals (e.g., IRF control signals) of a second communication protocol (e.g., IRF communication protocol) that is different from the first communication protocol, and send the second control signals (e.g., IRF control signals) via the second communication protocol (e.g., IRF communication protocol) to each electronic device 120a, 120b, 120c, . . . , 120n based on the identity of each electronic device 120a, 120b, 120c, . . . , 120n.

Figure 2C:
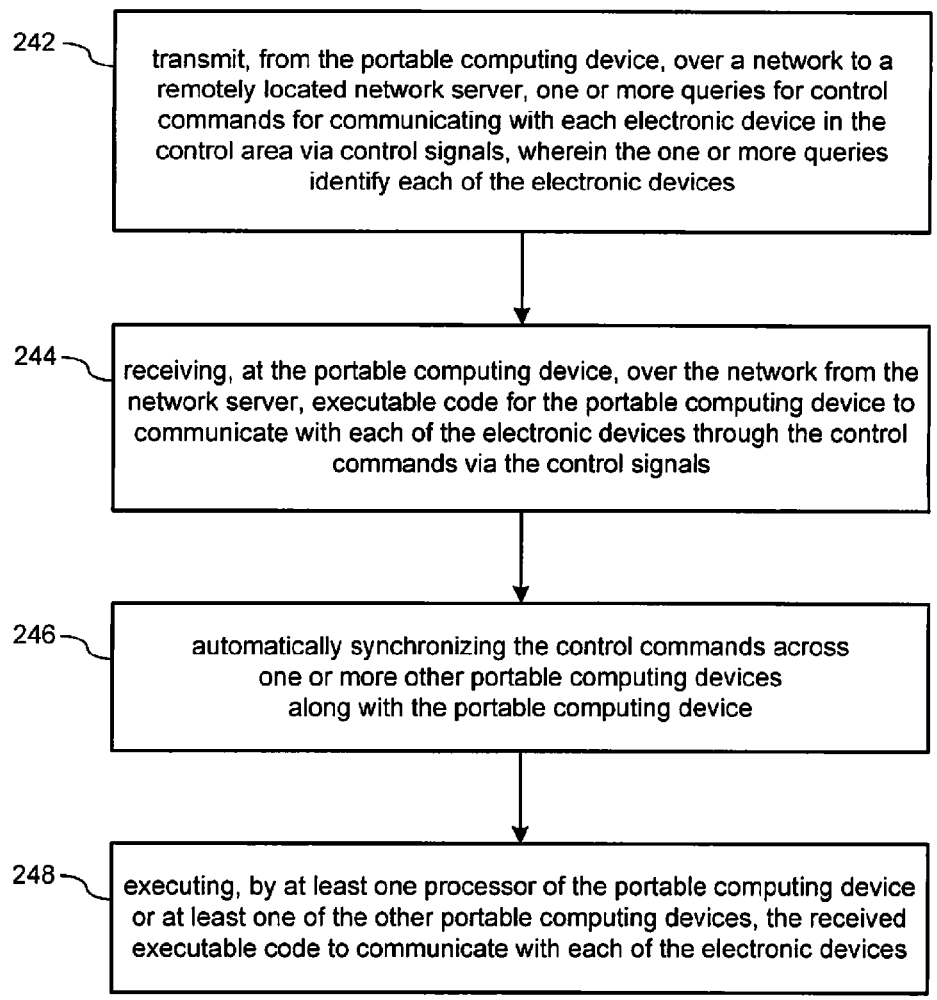
FIG. 2C is a process flow illustrating another example method for wirelessly controlling the one or more electronic devices in the control area and synchronizing one or more control commands across the one or more other portable computing devices.

FIG. 2C is a process flow illustrating another example method 240 for wirelessly controlling the one or more electronic devices 120a, 120b, 120c, . . . , 120n in the control area 104 and synchronizing one or more control commands across the one or more other portable computing devices (PCDs) 110a, 110b, . . . , 110n. In the example of FIG. 2C, operations 242-248 are illustrated as discrete operations occurring in sequential order. However, it should be appreciated that, in other implementations, two or more of the operations 242-248 may occur in a partially or completely overlapping or parallel manner, or in a nested or looped manner, or may occur in a different order than that shown. Further, additional operations, that may not be specifically illustrated in the example of FIG. 2C, may also be included in some implementations, while, in other implementations, one or more of the operations 242-248 may be omitted.

In the example of FIG. 2C, the method 240 may include a process flow for a computer-implemented method for using the portable computing device 102 as a universal remote control to wirelessly control the one or more electronic devices 120a, 120b, 120c, . . . , 120n in the control area 104, as described in reference to the system 100 of FIG. 1A. Further, as described herein, the operations 242-248 may be configured to provide a simplified operational process flow that may be enacted by the portable computing device 102 of FIG. 1A and to provide features and functionalities as described in reference to FIG. 1A.

At 242, the method 240 may include transmitting, from the portable computing device 102, over a network to the remotely located network server 130, one or more queries for control commands for communicating with each electronic device 120a, 120b, 120c, . . . , 120n in the control area 104 via control signals, wherein the one or more queries identify each of the electronic devices 120a, 120b, 120c, . . . , 120n.

At 244, the method 240 may include receiving, at the portable computing device 102, over the network from the network server 130, command codes for the portable computing device 102 to communicate with each of the electronic devices 120a, 120b, 120c, . . . , 120n through the control commands via the control signals.

At 246, the method 240 may include automatically synchronizing the control commands across one or more other portable computing devices 110a, 110b, . . . , 110n along with the portable computing device 102.

At 248, the method 240 may include executing, by at least one processor of the portable computing device 102 or at least one of the portable computing devices 110a, 110b, . . . , 110n, the received command codes to communicate with each of the electronic devices 120a, 120b, 120c, . . . , 120n.

In an implementation, the method 240 may include executing, by at least one processor of the portable computing device 102 or at least one of the portable computing devices 110a, 110b, . . . , 110n, the received command codes to communicate with each of the electronic devices 120a, 120b, 120c, . . . , 120n via the communication hub 140 in a manner as described in reference to FIGS. 1B and 2B.

In an implementation, the method 240 may include accessing an account stored on the network-maintained database 132 of the network server 130 over the network to receive, at the portable computing device 102, over the network from the network server 130, the command codes for the portable computing device 102 to communicate with each of the electronic devices 120a, 120b, 120c, . . . , 120n through the control commands via the control signals.

Figure 3A:
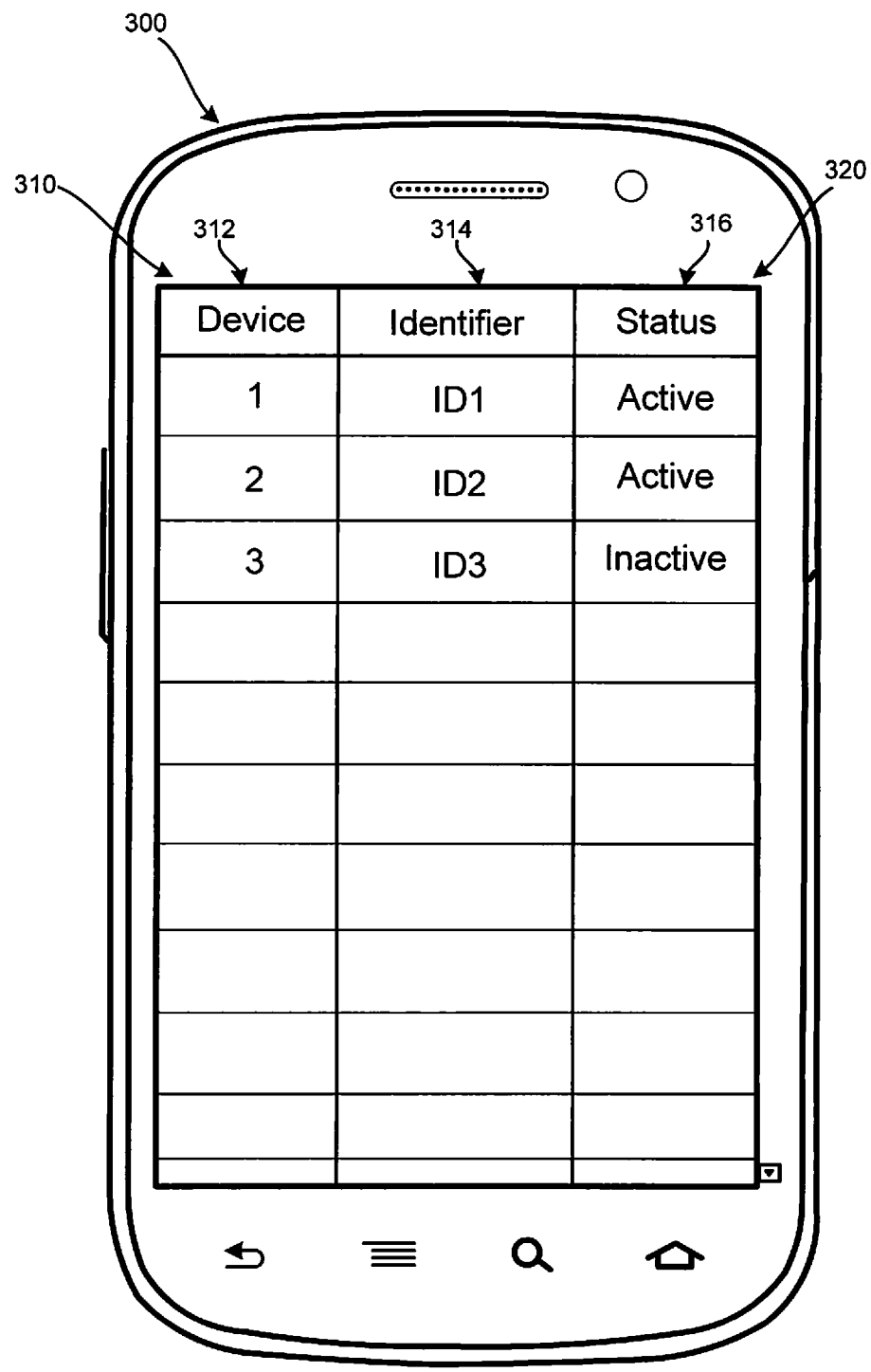
FIGS. 3A-3C are diagrams illustrating various examples of an interaction graphical user interface (GUI) of a portable computing device.
Figure 3B:
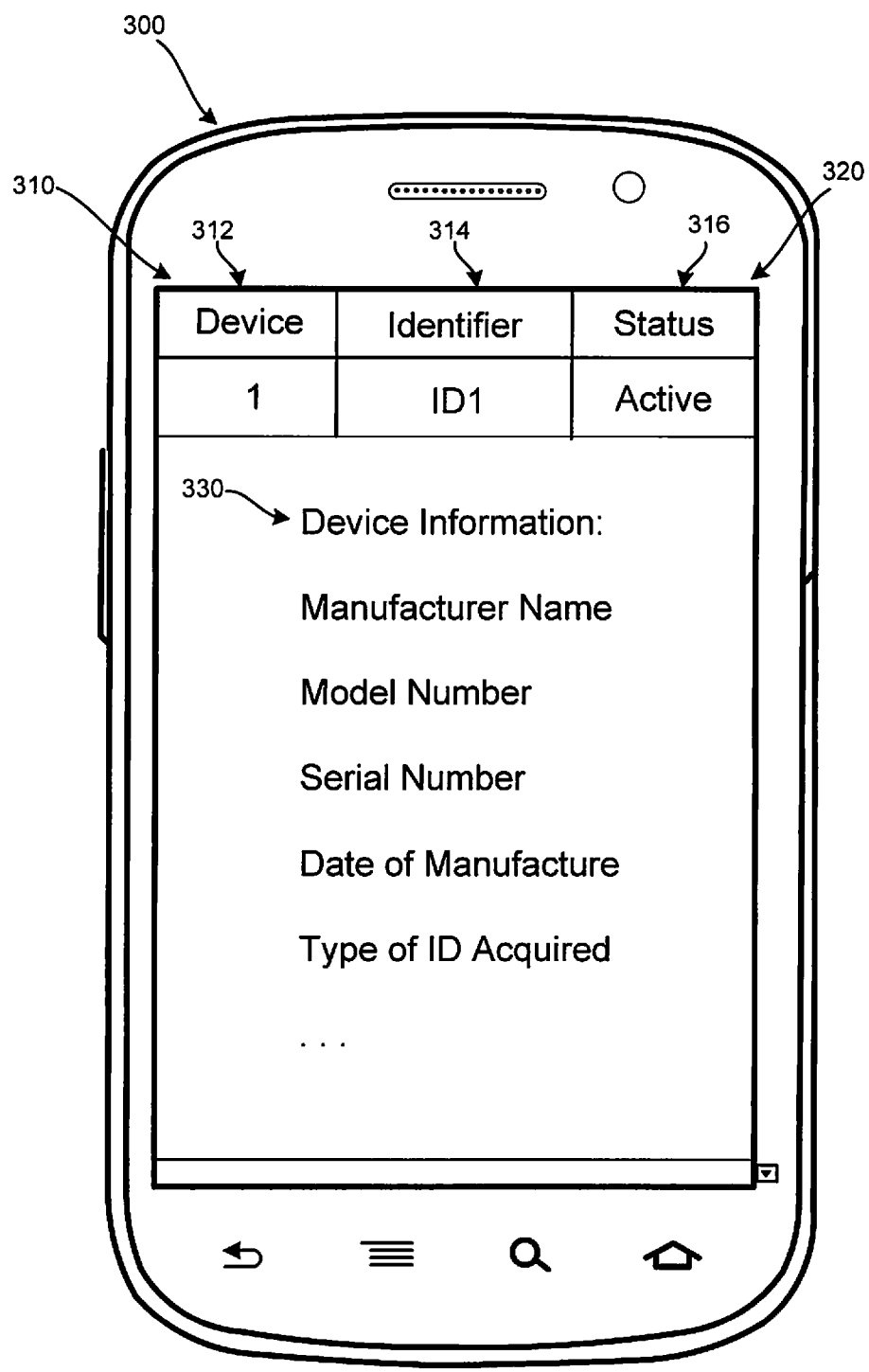
Figure 3C:
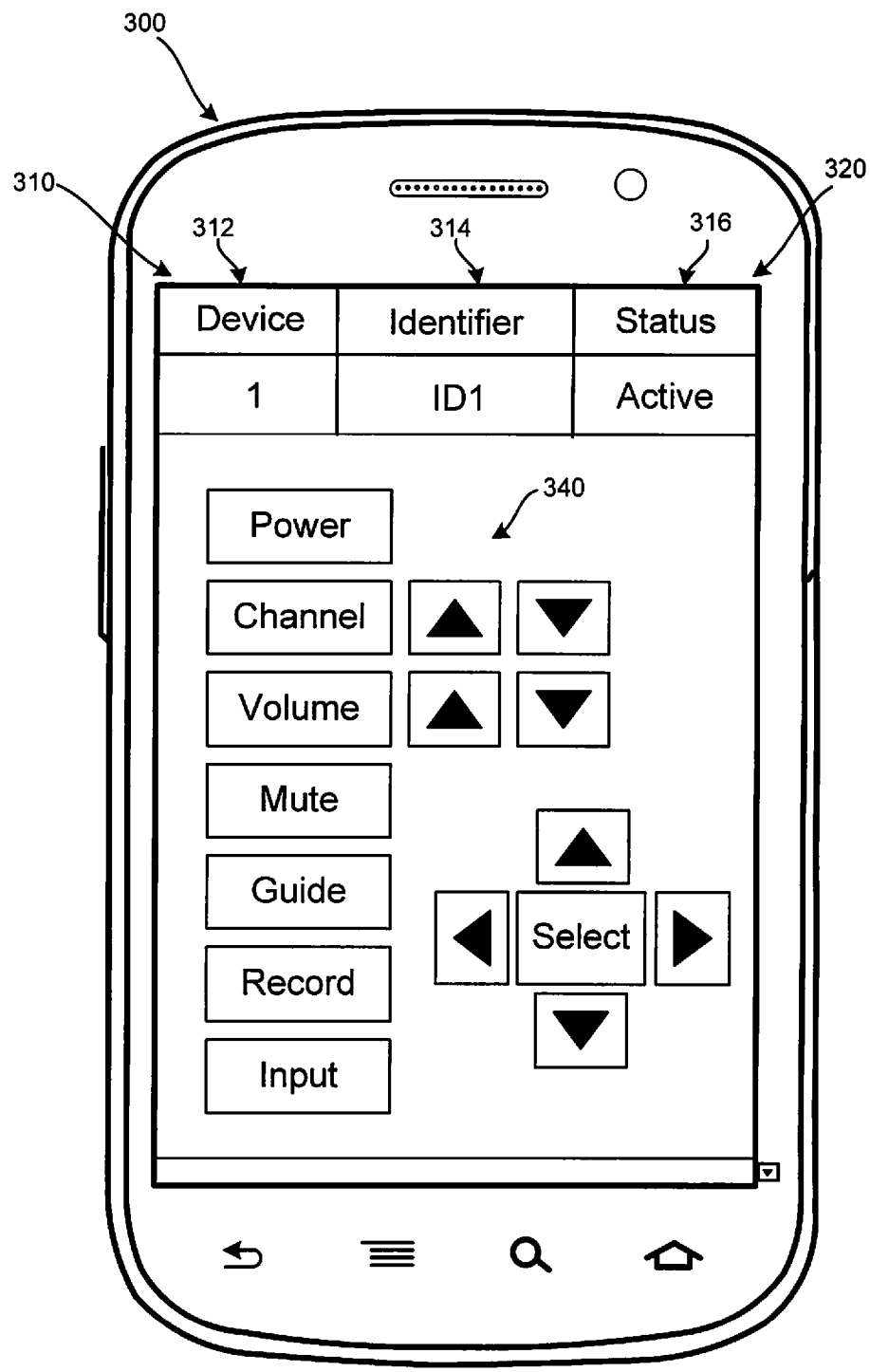

FIGS. 3A-3C is a diagram illustrating various examples of an interaction graphical user interface (GUI) 310 of a portable computing device 300, such as the portable computing device 102, to control one or more of the electronic devices 120a, 120b, 120c, . . . , 120n in the control area 104.

In particular, FIG. 3A is a diagram illustrating identity and status information related to the one or more electronic devices 120a, 120b, 120c, . . . , 120n as displayed (e.g., rendered) within the interaction GUI 310 of the portable computing device 300, such as, for example, the portable computing device 102. The interaction GUI 310 may be displayed within a display 320 of the portable computing device 300. In some implementations, as shown in FIG. 3A, the interaction GUI 310 may be displayed after one or more electronic devices 120a, 120b, 120c, . . . , 120n have been identified by the portable computing device 300.

As shown in FIG. 3A, the identity and status of the one or more electronic devices 120a, 120b, 120c, . . . , 120n may be displayed in different rows of the interaction GUI 310. In this implementation, each electronic device 120a, 120b, 120c, . . . , 120n may be given at least one of a control area device number 312 (e.g., 1, 2, 3, . . . , n), a corresponding control area identifier 314 (e.g., identifiers ID1, ID2, ID3, . . . , IDn), and a control area status indicator 316 (e.g., active status or inactive status).

In an implementation, each electronic device 120a, 120b, 120c, . . . , 120n identified by the portable computing device 300 may be rank-ordered based on at least one of the control area device number 312, the control area identifier 314 (e.g., identifiers ID1, ID2, ID3, . . . , IDn), and/or the control area status indicator 316. In some implementations, as shown in FIG. 3B, the control area identifiers 314 may refer to specific device information 330 that may be used to provide identity information related to a specific electronic device 120a, 120b, 120c, . . . , 120n, including at least one of manufacturer name, model number, serial number, data of manufacture, and type of identifier used to acquire the identity of the device, such as RF ID, barcode, manual user input, etc. In some implementations, the control area identifiers 314 may be randomly generated by the portable computing device 300, assigned by a user, and/or may comprise temporary identifiers assigned by the portable computing device 300 that may be used to conceal the actual identity of the corresponding electronic device 120a, 120b, 120c, . . . , 120n in the control area 104. In some implementations, one or more of the identifiers 314 may be deleted by a user of the portable computing device 300 after being displayed.

The device information 330 may include various other information in addition to the information shown. For instance, the device information 330 may include a particular interest or personal device name associated with a user. Further, a password may be assigned by a user to use the control features, the synchronization feature, and any other features described herein. In an implementation, a password may be assigned by a user to each of the electronic device 120a, 120b, 120c, ..., 120n in the control area 104 so that a password may be verified by the portable communication device 300 prior to selection and/or control of a particular electronic device 120a, 120b, 120c, ..., 120n in the control area 104.

In some implementations, as shown in FIG. 3C, selection of a particular device identifier 314 by a user may be configured to trigger launching of an application (e.g., launching of an application as defined within a preference of a user, launching of a default application) through which additional device interaction may be requested. For instance, the interaction GUI 310 may be configured so that when, for example, identifier ID1 is selected, a control application enabling a control session with a user associated with identifier ID1 may be launched to control features 340 of the selected electronic device, such as at least one of the electronic devices 120a, 120b, 120c, ..., 120n.

For instance, in the example of FIG. 3C, the interaction GUI 310 of the portable computing device 300 may be configured to control features 340 of a media device, such as a any type of digital or analog video broadcast entertainment device including a satellite enabled monitor, television, digital video player, digital video recorder (DVR), stereo receiver, digital radio, analog radio, etc. In an implementation, an identified device in the control area 104 may include at least one of the electronic devices 120a, 120b, 120c, ..., 120n that may comprise, for example, a satellite enabled monitor or television, wherein control commands sent from the portable communication device 300 to the identified device may include power, channel up/down, volume up/down, mute, guide, record, input select right/left/up/down, etc. In other implementations, the control commands may include various other control commands in addition to the control commands shown in FIG. 3C.

The interaction GUI 310 (or any other portion of the portable computing device 300) may be configured to operate based on one or more platforms (e.g., one or more similar or different platforms) that may include one or more types of hardware, software, firmware, operating systems, runtime libraries, and/or so forth. In some implementations, the interaction GUI 310 may control a cluster of electronic devices 120a, 120b, 120c, ..., 120n. In some implementations, the interaction GUI 310 may be configured to operate any electronic device in the control area 104, and the interaction GUI 310 may be configured to operate the remote server 130 over the network. In some other implementations, the interaction GUI 310 may be configured to operate any electronic device inside and/or outside the control area 104 via the remote server 130.

In some implementations, the interaction GUI 310 may be configured to operate at a hub device, such as, for example, the communication hub 140 in the control area 104, to thereby control the one or more electronic devices 120a, 120b, 120c, ..., 120n in the control area 104. In some implementations, the interaction GUI 310 may function as a background application operating in conjunction with the portable computing device 300 (and/or one or more other devices). In some implementations, the interaction GUI 310 may function as an application (or service) that may be accessed via an application programming interface (API).

The interaction GUI 310 may be, or may include, any type of hardware and/or software configured to process attributes. In some implementations, one or more portions of the components shown in the interaction GUI 310 in FIG. 2 may be, or may include, a hardware-based module (e.g., a digital signal processor (DSP), a field programmable gate array (FPGA), a memory), a firmware module, and/or a software-based module (e.g., a module of computer code, a set of computer-readable instructions that may be executed at a computer). For example, in some implementations, one or more portions of the interaction GUI 310 may be, or may include, a software module configured for execution by at least one processor. In some implementations, the functionality of the components may be included in different modules and/or different components. For example, the functionality of the interaction GUI 310 may be included in a single module or divided into several different modules.

Although not shown, in some implementations, the interaction GUI 310 (or portions thereof) and/or the portable computing device 300 (or portions thereof) may be configured to operate within, for example, a data center (e.g., a cloud computing environment), a computer system, one or more server/host devices, and/or so forth. In some implementations, the interaction GUI 310 (or portions thereof) and/or the portable computing device 300 (or portions thereof) may be configured to operate within a network. Thus, in some implementations, the interaction GUI 310 (or portions thereof) and/or the portable computing device 300 (or portions thereof) may be configured to function within various types of network environments that may include one or more devices and/or one or more server devices. For example, the network may be, or may include, a local area network (LAN), a wide area network (WAN), and/or so forth. The network may be, or may include, a wireless network and/or wireless network implemented using, for example, gateway devices, bridges, switches, and/or so forth. The network may include one or more segments and/or may have portions based on various protocols such as Internet Protocol (IP) and/or a proprietary protocol. The network may include at least a portion of the Internet.

Figure 4:
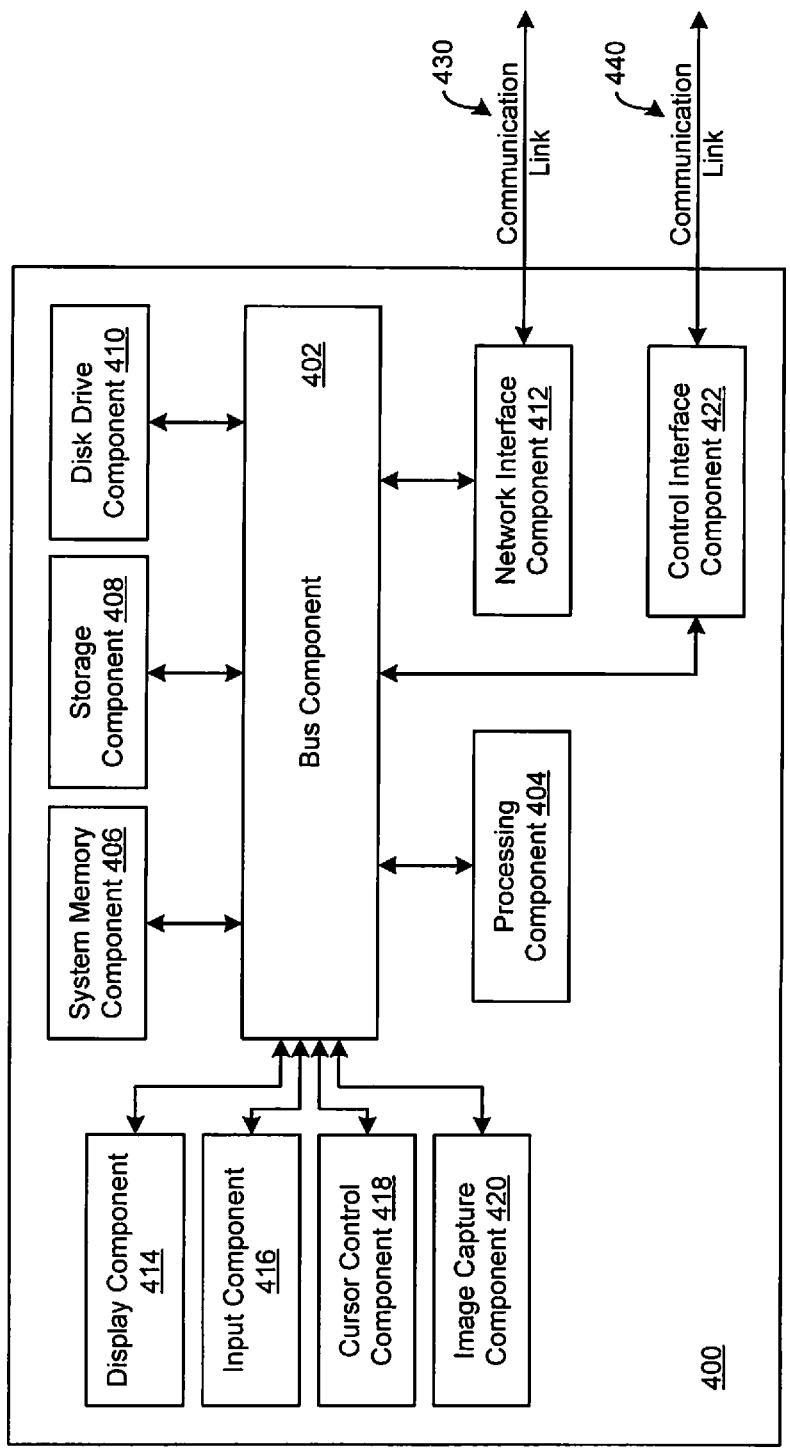
FIG. 4 is a block diagram illustrating an example computer system suitable for implementing embodiments of the disclosure.

FIG. 4 is a block diagram illustrating an example computer system suitable for implementing embodiments of the disclosure, including the portable computing device 102, each of the other portable computing devices 110a, 110b, ..., 110n, each of the electronic devices 120a, 120b, 120c, ..., 120n, the network server 130, and/or the communication hub 140.

For instance, in various implementations, the portable computing device 102 may comprise one or more network communication devices 412 (e.g., smart phone, wireless cellular phone, Wi-Fi access point, Bluetooth access point, etc.) adapted for communication with the network and the control area 104. The portable computing device 102 may be implemented as a PC, PDA, notebook computer, tablet computer, and/or various other generally known types of wired and/or wireless computing devices for communication with the network and the control area 104.

The portable computing device 102 may be configured to wirelessly communicate with the network server 130 over the network via a communication link 430 established with at least one network interface component 412 using any known wireless communications technologies and protocols including radio frequency (RF), microwave frequency (MWF), and/or infrared frequency (IRF) wireless communications technologies and protocols adapted for communication over the network.

The portable computing device 102 may be configured to wirelessly communicate with each of the other portable computing devices 110a, 110b, ..., 110n, each of the electronic devices 120a, 120b, 120c, ..., 120n, and/or the communication hub 140 in the control area 104 via the communication link 430 established with the at least one network interface component 412 using any known wireless communications technologies and protocols including RF, MWF, and/or IRF wireless communications technologies and protocols adapted for communication in the control area 104.

The portable computing device 102 may be configured for use as a universal remote control to wirelessly control the one or more electronic devices 120a, 120b, 120c, . . . , 120n in the control area 104 via another communication link 440 established with at least one control interface component 422 using any known wireless communications technologies and protocols including RF, MWF, and/or IRF wireless communications technologies and protocols adapted for communication in the control area 104.

In accordance with aspects of the disclosure, the computer system 400 may include a bus 402 or other communication mechanism for communicating information, which interconnects subsystems and components, such as, for example, at least one processing component 404 (e.g., processor, microcontroller, digital signal processor (DSP), etc.), system memory component 406 (e.g., RAM), static storage component 408 (e.g., ROM), disk drive component 410 (e.g., magnetic or optical), one or more network interface components 412 (e.g., modem, Ethernet card, RF ID reader, RF and/or IRF transceiver, RF and/or IRF transmitter, and/or RF and/or IRF receiver), display component 414 (e.g., CRT or LCD), input component 416 (e.g., keyboard), cursor control component 418 (e.g., mouse or trackball), and image capture component 420 (e.g., analog or digital camera, scanner, barcode reader), and one or more control interface components 440 (e.g., RF and/or IRF transceiver, RF and/or IRF transmitter, and/or RF and/or IRF receiver). In one implementation, disk drive component 410 may comprise a database having one or more disk drive components.

In accordance with embodiments of the disclosure, the computer system 400 may be configured to perform specific operations by the at least one processor 404 executing one or more sequences of one or more instructions contained in system memory component 406. Such instructions may be read into system memory component 406 from another computer readable medium, such as static storage component 408 or disk drive component 410. In other embodiments, hard-wired circuitry may be used in place of or in combination with software instructions to implement the disclosure.

Logic may be encoded in a computer readable medium, which may refer to any medium that participates in providing instructions to the at least one processor 404 for execution. Such a medium may take many forms, including but not limited to, non-volatile media and volatile media. In various implementations, non-volatile media may include optical or magnetic disks, such as disk drive component 410, and volatile media may include dynamic memory, such as system memory component 406. In an aspect, data and information related to executing instructions may be transmitted to computer system 400 via a transmission media, such as in the form of acoustic or light waves, including those generated during radio wave and infrared data communications. In various implementations, transmission media may include coaxial cables, copper wire, and fiber optics, including wires that comprise bus 402.

Some common forms of non-transitory computer readable media may include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by the computer system 400. In various other embodiments of the disclosure, a plurality of computer systems 400 coupled by communication link 430 (e.g., network of FIG. 1, such as a LAN, WLAN, PTSN, and/or various other wired or wireless networks, including telecommunications, mobile, and cellular phone networks) may perform instruction sequences to practice the disclosure in coordination with one another.

Computer system 400 may transmit and receive messages, data, information and instructions, including one or more programs (i.e., application code) through communication link 430 and communication interface 412. Received program code may be executed by processor 404 as received and/or stored in disk drive component 410 or some other non-volatile storage component for execution.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry (e.g., an FPGA (field programmable gate array) or an ASIC (application-specific integrated circuit)).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory may be supplemented by, or incorporated in special purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Implementations may be implemented in a computing system that may include a back-end component (e.g., as a data server), or that may include a middleware component (e.g., an application server), or that may include a front-end component (e.g., a client computer having a graphical user interface or a Web browser) through which a user may interact with an implementation, or any combination of such back-end, middleware, or front-end components. Components may be interconnected by any form or medium of digital data communication (e.g., communication network). Examples of communication networks include a local area network (LAN) (e.g., the intranet) and a wide area network (WAN) (e.g., the Internet).

While certain features of described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein may include various combinations and/or sub-combinations of the functions, components and/or features of the different implementations described.

What is claimed is:

1. A method comprising:
   transmitting, from a portable computing device, over a network to a remotely located network server that includes a network-maintained database and that is outside a control area of one or more electronic device, one or more queries for control commands for communication via control signals with each electronic device in the control area, wherein the one or more queries identify each of the one or more electronic devices;
   receiving, at the portable computing device, over the network from the network server, executable command codes for the portable computing device to communicate with each of the one or more electronic devices through the control commands via the control signals;
   accessing an account stored on the network-maintained database over the network to automatically synchronize the control commands across one or more other portable computing devices along with the portable computing device; and
   executing, by at least one processor of the portable computing device, the received executable command codes to communicate with each of the one or more electronic devices through the control commands via the control signals,
   wherein the portable computing device comprises one or more communication components including at least one of a transceiver, a transmitter, a receiver, and an antenna to communicate with the network server over the network that is outside the control area and each of the one or more electronic devices in the control area.

2. The method of claim 1, wherein the remotely located network server includes a network-maintained database, the method further comprising:
   uploading information associated with one or more of the electronic devices from the portable computing device to an account stored on the network-maintained database over the network, wherein the uploaded information may include control commands.

3. The method of claim 1, wherein the remotely located network server includes a network-maintained database, the method further comprising:
   uploading information associated with one or more of the electronic devices by an entity associated with the one or more electronic devices to the network-maintained database over the network, wherein the uploaded information may include control commands.

4. The method of claim 1, wherein:
   the control signals comprise at least one of infrared signals and radio frequency signals, and
   the control area is defined by a communication protocol used by the portable computing device to communicate with each of the one or more electronic devices via at least one of the infrared signals and the radio frequency signals.

5. The method of claim 1, further comprising:
   automatically discovering an identity of each of the one or more electronic devices,
   wherein each of the one or more electronic devices is configured to wirelessly communicate with the portable computing device in the control area using a communication protocol.

6. The method of claim 1, wherein each of the one or more electronic devices comprises a media related device for broadcasting one or more types of entertainment services.

7. The method of claim 1, further comprising:
   searching the network for a schedule of broadcast media related content for each of the one or more electronic devices,
   wherein the schedule comprises a schedule of broadcast media related content linked to each of the one or more electronic devices based on an identity of each device, and
   wherein the broadcast media related content may include data for at least one of text, audio, video images, and still images.

8. The method of claim 1, further comprising:
   providing a user interface to separately control each of the one or more electronic devices and to separately select scheduled content for each device based on an identity of each device; and
   receiving user input via the user interface, wherein the user input may include information related to the identity of each device.

9. The method of claim 8, wherein providing a user interface comprises providing a graphical user interface with user-actuated features to separately control each device and to separately select scheduled broadcast content for each device based on the identity of each device.

10. The method of claim 8, wherein the user interface includes an audio based user interface, and further comprising:
    receiving voice commands via the audio based user interface to separately control each device and to separately select scheduled broadcast content for each device based on the identity of each device.

11. The method of claim 1, wherein executing, by at least one processor of the portable computing device, the received executable command codes to communicate with each of the one or more electronic devices comprises:
sending infrared control signals directly to each of the one or more electronic devices to separately control each device based on an identity of each device.

12. The method of claim 1, wherein executing, by at least one processor of the portable computing device, the received executable command codes to communicate with each of the one or more electronic devices comprises:
sending Bluetooth control signals to a communication hub to separately control each device based on an identity of each device,
wherein the communication hub is configured to receive the Bluetooth control signals, convert the Bluetooth control signals to infrared control signals, and send the infrared control signals to each device based on the identity of each device.

13. A portable computing device comprising:
a transmitter configured for transmitting, from the portable computing device, over a network to a remotely located network server that includes a network-maintained database and that is outside a control area of one or more electronic devices in a control area, one or more queries for control commands for communication via control signals with each of the one or more electronic device in the control area, wherein the one or more queries identify each of the one or more electronic devices;
a receiver configured for receiving, at the portable computing device, over the network from the network server, executable command codes for the portable computing device to communicate with each of the one or more electronic devices through the control commands via the control signals;
a module configured for accessing an account stored on the network-maintained database over the network to automatically synchronize the control commands across one or more other portable computing devices along with the portable computing device; and
a processor configured for executing the received executable command codes to communicate with each of the one or more electronic devices,
wherein the portable computing device comprises one or more communication components including at least one of a transceiver, a transmitter, a receiver, and an antenna to communicate with the network server over the network and each of the one or more electronic devices in the control area.

14. The portable computing device of claim 13, wherein the remotely located network server includes a network-maintained database, and further comprising:
a module configured for uploading information associated with one or more of the electronic devices from the portable computing device to an account stored on the network-maintained database over the network, wherein the uploaded information may include control commands.

15. The portable computing device of claim 13, further comprising:
a module configured for automatically discovering an identity of each of the one or more electronic devices,
wherein each of the one or more electronic devices are configured to wirelessly communicate with the portable computing device in the control area using a communication protocol.

16. A non-transitory computer-readable medium storing instructions that, when executed by a processor, cause a computing device to:
transmit, from a portable computing device, over a network to a remotely located network server that includes a network-maintained database and that is outside a control area of one or more electronic devices, one or more queries for control commands for communication via control signals with each of the electronic device in the control area, wherein the one or more queries identify each of the one or more electronic devices;
receive, at the portable computing device, over the network from the network server, executable command codes for the portable computing device to communicate with each of the one or more electronic devices through the control commands via the control signals;
access an account stored on the network-maintained database over the network to automatically synchronize the control commands across one or more other portable computing devices along with the portable computing device; and
execute, by at least one processor of the portable computing device, the received executable command codes to communicate with each of the one or more electronic devices,
wherein the portable computing device comprises one or more communication components including at least one of a transceiver, a transmitter, a receiver, and an antenna to communicate with the network server over the network and each of the one or more electronic devices in the control area.

17. The non-transitory computer-readable medium of claim 16, wherein the remotely located network server may include a network-maintained database, and further comprising instructions that, when executed by a processor, cause the computing device to:
upload information associated with one or more of the electronic devices from the portable computing device to an account stored on the network-maintained database over the network, wherein the uploaded information may include control commands.

* * * * *